(12) United States Patent
Uliel

(10) Patent No.: US 10,124,533 B2
(45) Date of Patent: Nov. 13, 2018

(54) ELECTROFUSION COUPLER COMPOSITION

(71) Applicant: Plasson Ltd., Maagan Michael (IL)

(72) Inventor: Ami Uliel, Maagan Michael (IL)

(73) Assignee: Plasson Ltd., Maagan Michael (IL)

( * ) Notice: Subject to any disclaimer, the term of this patent is extended or adjusted under 35 U.S.C. 154(b) by 382 days.

(21) Appl. No.: 14/608,216

(22) Filed: Jan. 29, 2015

(65) Prior Publication Data

US 2015/0210005 A1 Jul. 30, 2015

Related U.S. Application Data

(60) Provisional application No. 61/933,394, filed on Jan. 30, 2014.

(51) Int. Cl.
*F16L 47/00* (2006.01)
*B29C 65/34* (2006.01)
(Continued)

(52) U.S. Cl.
CPC .......... *B29C 65/342* (2013.01); *B29C 65/348* (2013.01); *B29C 65/3412* (2013.01); *B29C 65/3496* (2013.01); *B29C 66/112* (2013.01); *B29C 66/1222* (2013.01); *B29C 66/1224* (2013.01); *B29C 66/131* (2013.01); *B29C 66/5221* (2013.01); *B29C 66/52241* (2013.01); *B29C 66/52292* (2013.01); *B29C 66/73921* (2013.01); *B29C 70/58* (2013.01); *B29C 70/68* (2013.01); *B29C 70/682* (2013.01); *B29D 23/003* (2013.01); *C08L 23/06* (2013.01); *F16L 47/03* (2013.01); *B29C 65/3468* (2013.01); *B29C 65/8223* (2013.01); *B29C 65/8246* (2013.01); *B29C 65/8253* (2013.01); *B29C 66/71* (2013.01); *B29K 2023/065* (2013.01); *B29K 2505/02* (2013.01); *B29L 2031/24* (2013.01); *B29L 2031/34* (2013.01); *C08L 2205/025* (2013.01); *C08L 2207/04* (2013.01); *C08L 2207/062* (2013.01)

(58) Field of Classification Search
CPC ........................................................ F16L 47/03
USPC ....................................................... 285/21.2
See application file for complete search history.

(56) References Cited

U.S. PATENT DOCUMENTS

| | | |
|---|---|---|
| 3,506,519 A | 4/1970 | Blumenkranz |
| 4,274,662 A | 6/1981 | De Groot et al. |

(Continued)

FOREIGN PATENT DOCUMENTS

| | | | |
|---|---|---|---|
| JP | 2003-222287 | 8/2003 | |
| WO | WO 01/76851 | 10/2001 | |
| WO | WO 2015067574 A1 * | 5/2015 | .............. F16L 47/03 |

OTHER PUBLICATIONS

Restriction Official Action dated Feb. 10, 2017 From the US Patent and Trademark Office Re. U.S. Appl. No. 14/608,253. (8 pages).

(Continued)

*Primary Examiner* — David Bochna

(57) ABSTRACT

An electrofusion coupling member made of a thermoplastic substance having aluminum particles incorporated therein and further comprising an electric resistance heating element disposed therein, an electrofusion coupler device which includes the same, and a method for welding the device to other thermoplastic objects are provided herein.

12 Claims, 4 Drawing Sheets

(51) Int. Cl.
  *B29C 70/68* (2006.01)
  *B29C 70/58* (2006.01)
  *B29D 23/00* (2006.01)
  *C08L 23/06* (2006.01)
  *F16L 47/03* (2006.01)
  *B29C 65/00* (2006.01)
  *B29L 31/24* (2006.01)
  *B29L 31/34* (2006.01)
  *B29K 23/00* (2006.01)
  *B29K 505/02* (2006.01)
  *B29C 65/82* (2006.01)

(56) References Cited

U.S. PATENT DOCUMENTS

| | | |
|---|---|---|
| 4,455,482 A | 6/1984 | Grandclement |
| 4,486,650 A | 12/1984 | Birdgstock et al. |
| 4,579,882 A | 4/1986 | Kanbe et al. |
| 4,680,140 A | 7/1987 | Kageyama |
| 4,684,428 A | 8/1987 | Ewen et al. |
| 4,703,150 A | 10/1987 | Kunnecke et al. |
| 4,806,181 A | 2/1989 | Ewen et al. |
| 4,927,183 A | 5/1990 | Steinmetz et al. |
| 4,933,037 A | 6/1990 | De Jong |
| 4,947,012 A | 8/1990 | Minarovic |
| 4,958,857 A | 9/1990 | Sixsmith |
| 5,104,468 A | 4/1992 | De Jong |
| 5,229,581 A * | 7/1993 | Boulet d'Auria ....... F16L 47/03 285/21.2 |
| 5,252,810 A | 10/1993 | Troesch et al. |
| 5,348,045 A | 9/1994 | Serve |
| 5,354,100 A | 10/1994 | Wall et al. |
| 5,375,889 A | 12/1994 | Nakashiba et al. |
| 5,496,865 A | 3/1996 | Heese et al. |
| 5,577,529 A | 11/1996 | Katz |
| 5,601,315 A | 2/1997 | Bunger et al. |
| 5,687,996 A | 11/1997 | Steinmetz et al. |
| 5,732,732 A | 3/1998 | Gross et al. |
| 6,193,834 B1 | 2/2001 | Smith |
| 6,375,226 B1 | 4/2002 | Dickinson et al. |
| 6,392,208 B1 | 5/2002 | Arx |
| 6,840,546 B2 | 1/2005 | Tanaka et al. |
| 7,064,300 B1 | 6/2006 | Emerson |
| 7,569,624 B2 * | 8/2009 | Kolbe ....................... C08J 9/10 523/200 |
| 7,798,531 B2 | 9/2010 | Kwak |
| 8,201,573 B2 | 6/2012 | Christodoulou et al. |
| 8,424,917 B2 | 4/2013 | Christodoulou et al. |
| 2008/0161469 A1 | 7/2008 | Hoss et al. |
| 2009/0148300 A1 | 6/2009 | Driver et al. |
| 2015/0210823 A1 | 7/2015 | Uliel |

OTHER PUBLICATIONS

European Search Report and the European Search Opinion dated Jun. 9, 2015 From the European Patent Office Re. Application No. 15152995.5.
European Search Report and the European Search Opinion dated Jun. 19, 2015 From the European Patent Office Re. Application No. 15152994.8.
Official Action dated Apr. 21, 2017 From the US Patent and Trademark Office Re. U.S. Appl. No. 14/608,253. (14 pages).
Official Action dated Oct. 27, 2017 From the US Patent and Trademark Office Re. U.S. Appl. No. 14/608,253. (9 pages).
Advisory Action Before the Filing of an Appeal Brief dated Feb. 12, 2018 From the US Patent and Trademark Office Re. U.S. Appl. No. 14/608,253. (2 pages).
Advisory Action Before the Filing of an Appeal Brief dated Apr. 30, 2018 From the US Patent and Trademark Office Re. U.S. Appl. No. 14/608,253. (3 pages).
Patent Examination Report dated Apr. 11, 2018 From the Australian Government, IP Australia Re. Application No. 2015200441. (4 Pages).
Patent Examination Report dated Apr. 11, 2018 From the Australian Government, IP Australia Re. Application No. 2015200442. (4 Pages).
Official Action dated May 24, 2018 From the US Patent and Trademark Office Re. U.S. Appl. No. 14/608,253. (12 pages).

* cited by examiner

ELECTROFUSION COUPLER COMPOSITION

RELATED APPLICATION

This application claims the benefit of priority under 35 USC 119(e) of U.S. Provisional Patent Application No. 61/933,394 filed on Jan. 30, 2014, the contents of which are incorporated herein by reference in their entirety.

FIELD AND BACKGROUND OF THE INVENTION

The present invention, in some embodiments thereof, relates to electrofusion, and more particularly, but not exclusively, to a thermoplastic composition useful in the manufacturing of electrofusion couplers.

Heat fusion process comprises the heating of two thermoplastic surfaces to a designated temperature over the melting point, followed by application of a sufficient force to cause the melted materials to flow and mix, thereby resulting in fusion of the two components. When a heat fusion process is performed under optimal conditions, the joint area becomes at least as strong as the components themselves in terms of tensile and pressure properties, as well as in intactness and continuousness.

Electrofusion (EF) couplers, referred to interchangeably as electrofusion fittings or electrofusion adaptors, constitute a family of devices that are used to execute the heat fusion (welding) process, and typically comprise a body made of a thermoplastic substance, having an electrical resistance heating element, typically in the form of a metal wire or a coil, disposed in and adjacent to a surface of the body which is to be fused (welded) to another device that is also made of a thermoplastic substance. When a predetermined electric current is applied to the heating element for a predetermined period of time, the thermoplastic substance softens and/or melts, and the material of the coupler's body fuses to that of the other object which is to be welded to the coupler.

Electrofusion couplers (herein and throughout referred to as "EFC") are frequently used for butt, saddle and socket fusion in the production of pipe joints between various piping elements made of thermoplastic substances. For example, a pipe jointing EFC (pipe fitting) usually comprises a sleeve, a mat or a muff of a thermoplastic resin (such as, for example, polyethylene) embodying a coil of the resistance heating wire adjacent to its inner surface, wherein the ends of the wire protrude though the exterior surface for being connected to terminals for energizing the wire from a suitable electrical power control equipment. In the process of pipe jointing, the ends of the pipes to be connected are pushed into the hollow of the coupler, the necessary connections are made between the ends of the wire and the control equipment, and then a predetermined current is supplied for a controlled period to soften and fuse the material of the sleeve and pipes so that they become welded firmly together via the fitting.

While the abovementioned coupling method is mostly successful, it has the disadvantage that it must be carried out by trained and skilled personnel if good results are to be ensured, as the achieved weld's strength and integrity depends upon a faultless pipe-surface pretreatment at the joining ends (typically cleaning and scraping of the oxidized exterior polymer layer at the surface), and the use of a correct amount of heating energy for the correct period of time (including cooling time). These factors differ for pipes and coupler of different sizes and types. Improper pipe ends pretreatment, misuse of a coupler or deviation from coupler manufacturer instructions may lead to joint failure, leakage or pipe burst with detrimental consequences.

U.S. Pat. No. 4,486,650 teaches electrofusion fittings that include auxiliary terminal contact means connected electrically to a device having a characteristic electrical parameter the value of which can be sensed electrically by suitable apparatus and is selected in accordance with the electric power with which the fitting should be supplied.

U.S. Pat. No. 4,684,428 teaches a fusion pad which is produced by forming a spiral groove in the pad upper surface, and feeding a wire from a reel through a hole in the pad and secured to a terminal on the pad under surface while rotating the pad. Once the wire in placed in the groove, the pad is pressed by a heating element such that the adjacent groove walls melt at their upper regions and collapse inwardly onto the wire therebetween and solidify to retain the wire in the groove.

U.S. Pat. No. 4,703,150 teaches a connecting member having a sleeve body and a resistance heating wire embedded therein with terminals to a power source, whereas by heating the resistance heating wire, a welding area between the sleeve member is plasticized and welded.

U.S. Pat. No. 4,933,037 describes a molded connection piece and a method of making the same, in particular a boring saddle made of thermoplastic material and having a heating wire capable of conducting an electric current for producing a welded joint between the molded connection piece and an object to be joined with the molded connection piece.

Additional background art includes, for example, U.S. Pat. Nos. 3,506,519, 4,274,662, 4,455,482, 4,579,882, 4,680,140, 4,806,181, 4,927,183, 4,933,037, 4,947,012, 4,958,857, 5,104,468, 5,252,810, 5,348,045, 5,354,100, 5,375,889, 5,577,529, 5,601,315, 5,687,996, 5,732,732, 6,193,834, 6,375,226, 6,392,208, 6,840,546, 7,064,300, 7,798,531, 8,201,573 and 8,424,917.

SUMMARY OF THE INVENTION

Currently practiced electrofusion methodologies all involve use of a heating element which is energized so as to partially melt a thermoplastic substance so as to afford fusion of two or more articles, which is limited by the weld integrity, affected by the user's experience.

Embodiments of the present invention relate to a thermoplastic composition which is based on a combination of a thermoplastic substance, such as polyethylene, and a plurality of aluminum particles dispersed therein. This aluminum particles-containing thermoplastic composition is designed to afford improved welding performance when used to make an electrofusion coupler, even at the hands of an inexperienced user.

Embodiments of the present invention further relate to electrofusion couplers of all shapes and forms, based on the presently claimed aluminum particles-containing thermoplastic composition.

According to an aspect of some embodiments of the present invention there is provided an electrofusion coupling member which comprises:

a body having one or more contact surface(s); and one or more electric resistance heating element(s) disposed in or on the body adjacent to the contact surface, wherein the body comprises at least one thermoplastic composition including a thermoplastic substance and a plurality of aluminum particles incorporated in the thermoplastic substance.

According to some embodiments of the invention, the electrofusion coupling member further comprises terminal means adapted to connect the electric resistance heating element(s) to an electric power source.

According to some of any of the embodiments of the invention, the thermoplastic substance comprises a thermoplastic polymer.

According to some embodiments of the invention, the thermoplastic polymer is a polyethylene.

According to some embodiments of the invention, the thermoplastic polymer is selected from the group consisting of low-density polyethylene (LDPE), linear low-density polyethylene (LLDPE), high-density polyethylene (HDPE), medium-density polyethylene (MDPE), cross-linked polyethylene (PEX), ultra-high-molecular-weight polyethylene (UHMWPE) and any combination thereof.

According to an aspect of some embodiments of the present invention there is provided a thermoplastic composition which comprises polyethylene and a plurality of aluminum particles dispersed therein, wherein the concentration of the aluminum particles ranges from 1 weight percent to 50 weight percent of the total weight of the composition.

According to some of these embodiments, the polyethylene in the thermoplastic composition is selected from the group consisting of low-density polyethylene (LDPE), linear low-density polyethylene (LLDPE), high-density polyethylene (HDPE), medium-density polyethylene (MDPE), cross-linked polyethylene (PEX), ultra-high-molecular-weight polyethylene (UHMWPE) and any combination thereof.

According to some of any of the embodiments of the invention, for any of the electrofusion coupling members disclosed herein, the aluminum particles are characterized by an average diameter of less than 100 microns.

According to some of any of the embodiments of the invention, for any of the electrofusion coupling members disclosed herein, concentration of the aluminum particles in the thermoplastic substance is at least 3 weight percent of the total weight of the thermoplastic substance.

According to some of any of the embodiments of the invention, for any of the electrofusion coupling members disclosed herein, the concentration of the aluminum particles in the thermoplastic substance ranges from 1 weight percent to 30 weight percent of the total weight of the thermoplastic substance.

According to some of any of the embodiments of the invention, the concentration of the aluminum particles ranges from 3 weight percent to 10 weight percent of the total weight of the thermoplastic substance.

According to some of these embodiments of the invention, the concentration of the aluminum particles is 10 weight percent of the total weight of the thermoplastic substance.

According to some of any of the embodiments of the invention, for any of the electrofusion coupling members disclosed herein, the electrofusion coupling member is formed in a shape selected from the group consisting of a cylinder, a disc, a socket, a sleeve, a flat ring, an O-ring, an X-ring, a Q-ring, a gasket, a flange gasket, a sheet, a mat and a saddle.

According to some embodiments of the invention, the contact surface is being sized and shaped to match a joint surface of at least one thermoplastic object.

According to some embodiments of the invention, the contact surface and the joint surface constitute a pair of mating surfaces.

According to an aspect of some embodiments of the present invention there is provided an electrofusion coupler device which includes any of the electrofusion coupling members disclosed herein.

According to some embodiments of the invention, the device disclosed herein is formed in a shape selected from the group consisting of a pipe fitting, an adaptor, a flange, a flange clamp, a mat, a socket, a sleeve, a saddle, a branch saddle, a branch union, a transition saddle, a sewer saddle, a half coupling, a flex restraint, a tapping tee, a muff, a fixed elbow, an adjustable elbow, a trap, a splitter, a manifold, a reducer, an eccentric reducer, a nipple, an end-cap, a spigot and/or a valve.

According to some of any of the embodiments of the invention, the electrofusion coupling member is a contact surface of the device.

According to some of any of the embodiments of the invention, the contact surface is being sized and shaped to match a joint surface of at least one thermoplastic object.

According to some of any of the embodiments of the invention, the thermoplastic object is a thermoplastic pipe.

According to some of any of the embodiments of the invention, the contact surface and the joint surface constitute a pair of mating surfaces.

According to an aspect of some embodiments of the present invention there is provided a process of manufacturing any of the electrofusion coupling members disclosed herein; the process comprising:

mixing pellets of a first thermoplastic substance having the plurality of aluminum particles dispersed therein with pellets of a second thermoplastic substance to thereby form an aluminum particles-containing thermoplastic composition; and molding the aluminum particles-containing thermoplastic composition in a predesigned mold.

According to some embodiments of the invention, the process presented herein further comprises, prior to mixing the pellets of the first thermoplastic substance having the plurality of aluminum particles dispersed therein with the second thermoplastic substance, dispersing the plurality of aluminum particles in the first thermoplastic substance in a molten state; and forming the pellets of the first thermoplastic substance having the plurality of aluminum particles dispersed therein.

According to some of any of the embodiments of the invention, the process presented herein further includes disposing the electric resistance heating element in the body by disposing the electric resistance heating element in the mold prior to the molding or by disposing the electric resistance heating element in preformed grooves in the body following the molding.

According to an aspect of some embodiments of the present invention there is provided a process of manufacturing any of the devices disclosed herein; the process comprising placing any of the electrofusion coupling members disclosed herein in a mold, and injecting a first thermoplastic substance into the mold such that the member forms a contact surface of the device.

According to an aspect of some embodiments of the present invention there is provided a method of welding at least two thermoplastic pipes, the method is effected by:

providing any of the electrofusion coupling members disclosed herein formed in a shape of a pipe-adaptor having two openings;

inserting the end of each of the pipes into each of the openings; and applying a predetermined current through the electric resistance heating element for a predetermined period of time, to thereby melt the thermoplastic substance.

According to some of any of the embodiments of the invention, the method further comprises, prior to the insertion of the pipes, cleaning the joint surface at the end of each of the pipes.

According to some of any of the embodiments of the invention, the method further comprises, following the period of time, allowing the thermoplastic substance to cool and solidify.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
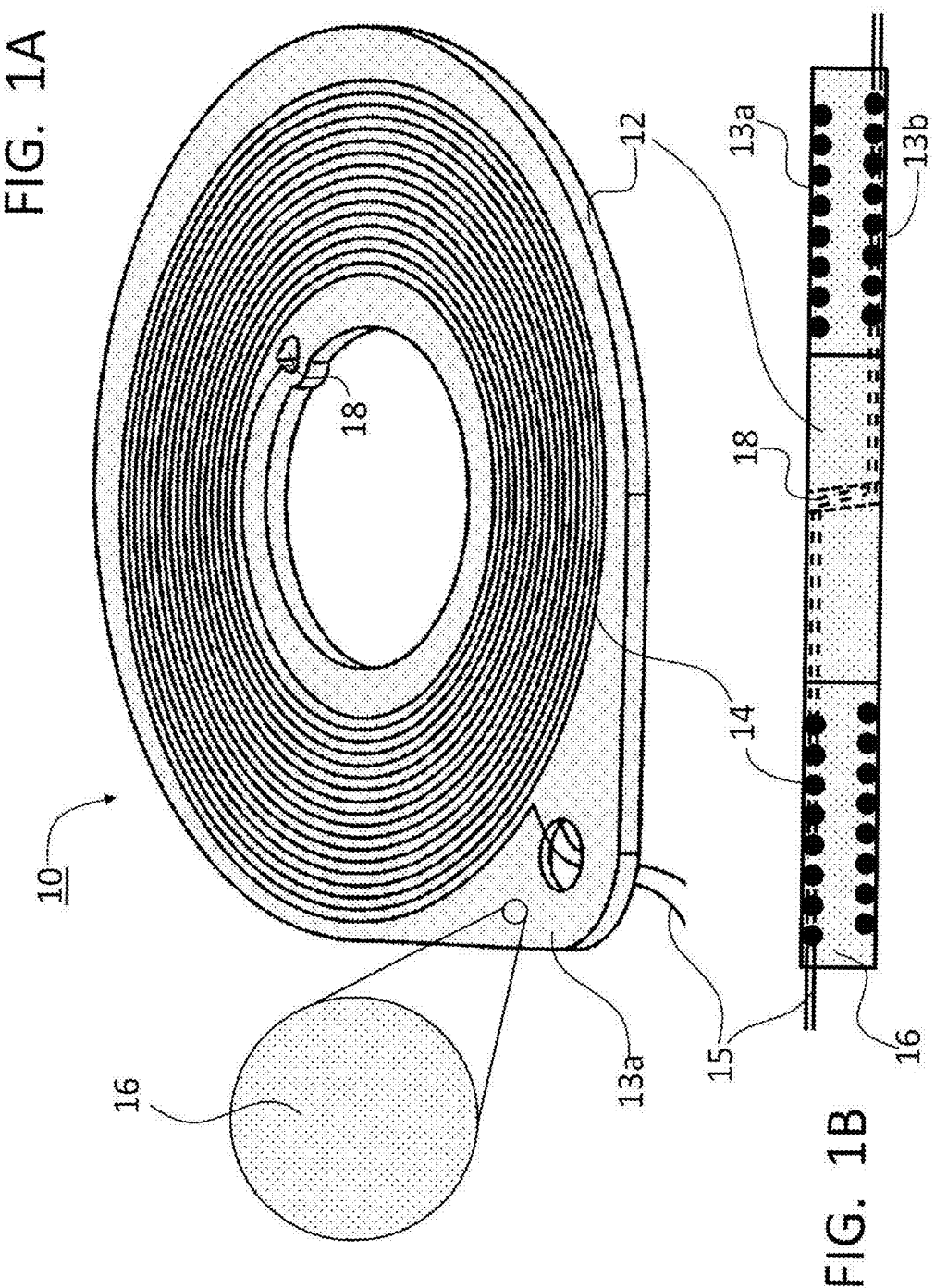
FIGS. 1A-B present an isometric illustration (FIG. 1A) and a longitudinal cross section (FIG. 1B) of an exemplary electrofusion coupling member 10 shaped as a mat or a disc.

The present invention, in some embodiments thereof, relates to electrofusion, and more particularly, but not exclusively, to a thermoplastic composition useful in the manufacturing of electrofusion couplers.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As described hereinabove, electrofusion has been used for decades to fuse together and couple thermoplastic pipes with relatively high degree of success, however the integrity of the welding result depends on several factors which cannot be controlled by the electrofusion coupler manufacturer since they depend on the practices and adherence to protocol of the person installing the pipe system. As discussed hereinabove, for a high integrity weld to be achieved by an experienced craftsman using contemporary electrofusion coupler (EFC) devices, the exterior surface near the ends of the pipes, or otherwise any joint surface of the pipe, particularly those manufactured by extrusion, should be scraped clean of the exposed plastic layer, which is considered oxidized and harmful for the welding process.

The scraping step is one part of the pipe pretreatment process, which further includes cleaning, edge chafing and cross-section rounding, which must be carried out by the end-user to achieve high pipe fusion integrity. High pipe fusion integrity is critical for most industrial and residential piping networks, and must adheres to the strict requirements of the industry's standards and regulations, such as the ASTM standards F2620 (Heat Fusion Joining of Polyethylene Pipe and Fittings) and/or F1290 (Standard Practice for Electrofusion Joining Polyolefin Pipe and Fittings).

While seeking a solution for end-user related weld failure, the present inventor envisioned a thermoplastic composition which can be used to produce an electrofusion coupling member that forms a part of any EFC, and which can afford satisfactory welding results. More specifically, the present inventor has contemplated the use of a moldable thermoplastic composition containing aluminum particles.

Electrofusion Coupling Member:

The present inventor has utilized fine aluminum powder within a resin used to produce the body of an electrofusion coupling member, and has shown that such a resin affords improved welding results, even on joint surfaces that were not properly pretreated prior to welding (e.g., exterior plastic layer was not scraped off prior to welding). The devised aluminum particles-containing thermoplastic composition was found to exhibit notably improved results compared to comparable known compositions used in contemporary EFC devices, while adhering to the strict requirements of the industry's standards and regulations, such as the ASTM D2837 (Standard Test Method for Obtaining Hydrostatic Design Basis for Thermoplastic Pipe Materials or Pressure Design Basis for Thermoplastic Pipe Products), ASTM D3350 (Standard Specification for Polyethylene Plastics Pipe and Fittings Materials), ASTM D3261 (Standard Specification for Butt Heat Fusion Polyethylene (PE) Plastic Fittings for Polyethylene (PE) Plastic Pipe and Tubing) and/or ASTM F894 (Standard Specification for Polyethylene (PE) Large Diameter Profile Wall Sewer and Drain Pipe).

According to an aspect of the present invention, there is provided an electrofusion coupling (EFC) member which includes:

a body having at least one contact surface, which comprises a thermoplastic composition that includes at least one thermoplastic substance and a plurality of aluminum particles incorporated therein; and at least one electric resistance heating element disposed in or on the body adjacent to the contact surface.

In some embodiments, the EFC member further comprises terminal means adapted to connect the electric resistance heating element to an electric power source. The term "body", as used herein, refers to the part of an electrofusion coupling member which is made of, inter alia, a thermoplastic composition as described herein. The "body" forms the EFC member such that during the electrofusion coupling process, at least a part of the body melts along with a part of at least one other object to be joined, to thereby fuse these melted parts. The body can be a generally flat body that can be used as a flat mat (see, FIG. 1 hereinbelow), or can be bent into various three dimensional shapes such as a cylinder, a saddle (see, FIG. 2 hereinbelow) and the likes. In general, the body has two "faces" (see, surfaces 13a and 13b in FIGS. 1B and 2 hereinbelow) and one or both can serve as a contact surface.

The body may exhibit a variety of structural features, such as openings, holes, grooves and the likes, as these are described hereinbelow, some of which are designed to host or hold an electric resistance heating element, as described in details hereinbelow and exemplified in the Figures, while other structural features are designed to interface with other parts of an electrofusion coupler device and/or with other objects, as described in details hereinbelow.

Thermoplastic Substance:

The main component of the body of the EFC member presented herein is a thermoplastic substance. In the context of embodiments of the present invention, the term "thermoplastic substance" refers to a substance that becomes pliable or moldable when heated above a specific temperature, and returns to a solid state upon cooling. Typically, a thermoplastic substance has a high molecular weight, and its molecules associate through intermolecular forces, which permits thermoplastic substances to be remolded because the intermolecular interactions increase upon cooling and restore the bulk properties. This attribute sets thermoplastic substances apart from thermosetting substances, which form irreversible chemical bonds during the curing/cooling process. It is therefore the reason why objects made from most thermoplastic substances can fuse to one-another when a surface of at least one of the objects is heated to a suitable temperature, allowing molecules from both sides of the fusing contact area to intertwine and form upon cooling a substantially single/continuous fused object. It is noted that many of the thermoplastic substances are organic or inorganic polymers, typically characterized by long molecular chains. Hence, in the context of embodiments of the present invention, the term "thermoplastic substance" also encompasses substances that can bond to one-another (fuse) when heated to a suitable temperature while in contact, and thereafter allowed to cool.

In the context of embodiments of the present invention, it is noted that several thermoplastic substances can be mixed together at various proportions in order to obtain specific properties of the resulting composition. According to some of any of the embodiments of the present invention, the thermoplastic substance is a polymer or a mixture of polymers.

According to some of any of the embodiments of the present invention, the thermoplastic substance comprises polyethylene and in some embodiments, the thermoplastic substance comprises one or more varieties of polyethylene (PE), or consists of one or more varieties of polyethylene.

According to some of any of the embodiments of the present invention, the aluminum particles-containing thermoplastic composition comprised by the body of the electrofusion coupling member is based on a single or a mixture of thermoplastic polymer(s). In some embodiments, the mixture of thermoplastic polymers includes one or more varieties of polyethylene, in some embodiments the mixture consists of one or more varieties of polyethylene, and in some embodiments the thermoplastic polymer is a single variety of polyethylene.

In the context of some embodiments, the polymers are pipe/coupling-grade polymers complying with widely accepted national and international standards. Any other thermoplastic substances/polymers are also contemplated.

In some embodiments, the aluminum particles-containing thermoplastic composition is based on a single or a mixture of polyethylene variety which include, without limitation, low-density polyethylene (LDPE), linear low-density polyethylene (LLDPE), high-density polyethylene (HDPE), medium-density polyethylene (MDPE), cross-linked polyethylene (PEX) and ultra-high-molecular-weight polyethylene (UHMWPE).

Exemplary pipe/coupling-grade thermoplastic high density polyethylene (HDPE) variety include, without limitation, PE 32, PE 40, PE 63, PE 80, PE 100, PE 100 RC, PE 100+, PE 4710 and PE 4710 PLUS, all of which are used in the piping industry as pipe and EFC derive materials.

It is noted that in some embodiments, some amount of low-density polyethylene, and particularly linear low-density polyethylene (LLDPE), is mixed together with HDPE. Other than the typical utility in mixing varieties of polyethylene in order to obtain specific properties, one reason for the presence of LLDPE in HDPE stems from the use of LLDPE as a more effective carrier for some additives. In the context of embodiments of the present invention, LLDPE or another variety of PE may serve as a carrier for the aluminum particles to be mixed in HDPE or another variety of PE, in the manufacturing process of the presently claimed electrofusion coupling member.

According to some of any of the embodiments described herein, the thermoplastic polymer of the aluminum particles-containing thermoplastic composition may also be based on, or include thermoplastic polymers which are added for their properties per se or added as carriers for other additives and/or substances. Such additive thermoplastic materials include, without limitation, acrylic polymers, nylon, polypropylene, polyvinyl chloride and Teflon.

In some general manufacturing practices, a thermoplastic substance, also referred to herein as a first thermoplastic substance, is used as a carrier for some types of additives, for chemical, mechanical, cost and other practical reasons. For example, an additive may have superior solubility or dispersion capacity in a certain carrier thermoplastic substance, compared to solubility or dispersion capacity in another thermoplastic substance, also referred to herein as a second thermoplastic substance, which is used in the manufacturing process; in which case the carrier thermoplastic substance and the other thermoplastic substance may be found at any relative content ratio (equal amounts of one major and the other minor). In another example, the additive is mixed in a carrier thermoplastic substance in order to form a concentrated stock composition for the additive, in which case the carrier thermoplastic substance is a minor component, and the other thermoplastic substance is a major component in the process; however, in some cases where a thermoplastic substance is used as a minor carrier of a concentrated stock, it can be an identical thermoplastic substance with respect to the major thermoplastic substance.

In some embodiments of the present invention, aluminum particles are suspended in a certain thermoplastic substance to form a concentrate, and that concentrate is mixed as a minor component with a relatively major quantity of another thermoplastic substance. In these embodiments, the minor component having a high concentration of aluminum particles is referred to as a "stock aluminum suspension", and the major component is referred to as the "base" substance.

One exemplary first thermoplastic substance, according to embodiments of the present invention, is LLDPE. Thermoplastic substances which are also suitable for serving as the first thermoplastic substance include homopolymers consisting of an α-olefin with 2-8 carbon atoms or a copolymerizate of two or more corresponding α-olefins, such as copolymerizates of ethylene, also a homopolymerizate of low density polyethylene (LDPE), very low density polyethylene (VLDPE), ultra low density polyethylene (ULDPE) or high density polyethylene (HDPE), propylene, also a homopolymerizate, 1-butylene, 1-pentylene, 1-hexylene, 1-octylene, isobutylene, 2-methyl-1-butylene, 3-methyl-1-pentylene, 4-methyl-1-pentylene, 2,3 dimethyl-1-butylene, 2-ethyl-1-butylene, and mixtures thereof. For example, a copolymerizate of ethylene with 1-butylene, 1-hexylene, 1-octylene or 4-methyl-1-pentylene; or an ethylenevinylacetate copolymerizate, an ethylvinylacetate copolymerizate (EVA), an ethyleneethylacetate copolymerizate, an ethyleneacrylic acid copolymerizate and mixtures thereof or with copolymers of ethylene and 1-butylene, 1-hexylene, 1-octylene or 4-methyl-1-pentylene; or ethylenepropylene rubber (EPDM), also diene modified (EP), a styrene butadiene styrene copolymerizate (SBS), a styrene ethylene butylene styrene copolymerizate (SEBS) and mixtures thereof. More examples for suitable first thermoplastic substances can be found in, for example, U.S. Pat. No. 5,496,865 which is incorporated herein by reference.

The second thermoplastic substance is used as the base polymer, and can be selected according to the application and intended use of the member/EFC. Typically, the second thermoplastic substance is one or more polymers of the HDPE variety, as presented hereinabove, however other thermoplastic substances are contemplated. The second thermoplastic substance is also selected such that it can be readily mixed with the stock aluminum suspension when both are in a molten stated.

The aluminum particles-containing thermoplastic composition described herein has aluminum particles, as described hereinbelow, incorporated therein. The term "incorporated", as used herein, describes thermoplastic compositions wherein aluminum particles are disposed on or in the bulk of the thermoplastic substance, and/or dispersed homogeneously or heterogeneously throughout the bulk of the substance.

According to some of any of embodiments of the present invention, the aluminum particles-containing thermoplastic composition described herein has aluminum particles dispersed homogeneously therein.

Aluminum Particles:

The plurality of aluminum particles, according to some of any of the embodiments of the present invention, may include pure aluminum and/or aluminum in one or more chemical form(s) (metal alloy, oxide, nitride, carbide etc.); the size of the particles may be characterized by a narrow, wide, bimodal or multiple modal size distribution; and the shape of the particles may take one or more forms.

The term "aluminum particle", as used herein, refers to a small solid object made substantially of a metallic aluminum. In the context of embodiments of the present invention, the term "aluminum particle" is meant to encompass pure aluminum particles, metal aluminum alloy particles, oxide-coated aluminum particles, aluminum carbide ($Al_4C_3$) coated aluminum particles, aluminum nitride (AlN) coated aluminum particles, and any combination of particle species (e.g., a mixture of metal alloyed, oxidized, nitrided and/or carbidized particles) and any combination of chemical composition per individual particle (e.g., a combination of one or more alloying metal, oxide, carbide and nitride species in or on a single/individual aluminum particle).

Aluminum (III) oxide, $Al_2O_3$ or alumina, commonly referred to as aluminium oxide, is a naturally occurring oxide which forms on the surface of aluminum when the latter is exposed to oxygen present in ambient atmosphere or in solutions. In the context of embodiments of the present invention, the aluminum particles may be coated with this naturally occurring oxide, and may further be characterized by some amounts of other aluminum-oxygen forms, such as aluminium (I) oxide ($Al_2O$) and aluminium (II) oxide (aluminium monoxide, AlO).

According to some embodiments, the particles are made of substantially pure aluminum, namely the aluminum contents of the particles, excluding oxides, carbides and nitrides forms and excluding other metals and other impurities, is at least 95%, 98% or 99% metallic aluminum. It is noted that aluminum oxide coating on pure aluminum is practically unavoidable in ambient conditions.

According to some embodiments, the particles are made substantially of aluminum containing some amounts of the oxide, carbide and/or nitride forms thereof, either on the surface of the particles or incorporated therein. Such aluminum particles may comprise 75%, 80%, 85%, 90% or 95% aluminum and the balance made of one or more of the oxide, carbide and/or nitride forms thereof.

According to some embodiments, the particles are made of a metal aluminum alloy, for example, an alloy made substantially of aluminum at a content of at least 50%, 55%, 60%, 65%, 70%, 75%, 80%, 85%, 90%, 95%, 98%, 99% or 99.9% by weight of aluminum, and/or oxides, carbides and nitrides thereof, and the balance made of one or more metal elements, such as, but not limited to, Li, Si, Fe, Cu, Mn, Mg, Cr, Zn, V, Ti, Bi, Ga, Pb and/or Zr, and/or oxides, carbides and nitrides thereof.

It is noted herein that aluminum particles having been modified by one or more surface group modifications, such as sol-gel, polymer or other organic compound coating, siliconization, sulfurization, galvanization and the likes, are also contemplated.

The plurality of aluminum particles can have an average diameter of less than 100 microns. According to some embodiments, the average diameter of the aluminum particles ranges from 5 microns to 100 microns. In some embodiments, the average particle diameter is 5 microns, 10 microns, 15 microns, 20 microns, 25 microns, 30 microns, 35 microns, 40 microns, 45 microns, 50 microns, 55 microns, 60 microns, 65 microns, 70 microns, 75 microns, 80 microns, 85 microns, 90 microns, 95 microns 100 microns, and any combination of any of these average size distribution groups at any respective ratio (for example, a combination of 40 micron and 70 micron particles at a ratio of 60:40 respectively). In some embodiments, the average particle diameter is about 50 microns. In some embodiments, the average particle diameter is less than 60 microns, less than 50 microns, less than 40 microns, less than 30 microns, less than 20 microns, or less than 10 microns.

The content or concentration of the aluminum particles in the thermoplastic substance is at least 1, 3, 5, 7 or at least 10 weight percent of the total weight of the thermoplastic substance. According to some embodiments, the concentration of the aluminum particles ranges from 1 weight percent to 30 weight percent of the total weight of the thermoplastic substance, or from 3 to 10, from 3 to 30, from 5 to 30, or from 10 to 30 weight percent of the total weight of the thermoplastic substance, and any value between the stated values. In some embodiments, the concentration is about 10 weight percent of the total weight of the thermoplastic substance. In some embodiments, the concentration of the aluminum particles is less than 30 weight percent of the total weight of the thermoplastic substance, less than 25 weight percent, less than 20 weight percent, less than 15 weight percent, less than 10 weight percent, or less than 5 weight percent.

It is noted herein that any combination of any thermoplastic substance, and any aluminum particles, as described herein, is encompassed herein as comprised by the body of the EFC member described herein.

Exemplary Aluminum Particles-Containing Thermoplastic Composition:

According to some embodiments, the electrofusion coupling member presented herein comprises an aluminum particles-containing thermoplastic composition which includes:

a mixture of LLDPE and HDPE at a ratio that ranges from 0:100 to 40:60;

a plurality of aluminum particles having an average size of about 50 microns and a concentration that ranges from 5 to 20 percent by weight of the total weight of the thermoplastic composition.

According to some embodiments, the aluminum particles-containing thermoplastic composition is composed of a thermoplastic polymer having a ratio of 10:90 LLDPE to HDPE and about 3 weight percent of aluminum particles having an average size of about 50 microns. Alternatively, the thermoplastic polymer is having a ratio of 20:80 LLDPE to HDPE and about 6 weight percent of aluminum particles having an average size of about 50 microns, and further alternatively the thermoplastic polymer is having a ratio of 30:70 LLDPE to HDPE and about 9 weight percent of aluminum particles having an average size of about 50 microns.

Heating Element:

The electric resistance heating element is typically a monolithic linear wire, a coiled wire or a twisted filaments wire, made of kanthal (a iron-chromium-aluminium (FeCrAl) alloy), nichrome (an alloy of nickel, chromium, and often iron), cupronickel (an alloy of copper that contains nickel and strengthening elements, such as iron and manganese) or other metals or metal alloys.

The electric resistance heating element is a spirally or a helically wound wire which is integrated thermoplastic substance of the body by over-molding, namely by holding the heating element in its predetermined configuration and thereafter inject or otherwise cover the heating element with the aluminum particles-containing thermoplastic composition presented herein. The heating element may also be embedded within the pre-molded body of the member by "plowing-in" the heating element, or by treading the heating element onto pre-molded tracks or grooves in the body. Other methods of integrating the heating element into the body of the electrofusion coupling member provided herewith are contemplated as well.

The heating element can be disposed adjacent one face of the body, or disposed adjacent to both faces of the body, depending on the intended use of the member, as discussed hereinbelow.

Body's Structural Features:

The electrofusion coupling member serves as the reservoir of the aluminum particles-containing thermoplastic composition presented herein as well as a holder for the heating element. The body can be designed so as to harbor a heating element on one side or on two sides thereof.

The body of the EFC member presented herein may exhibit any structural features such as grooves (such as for receiving the heating element), projections, protrusions, salients, bulges, recesses, protuberances, fragrances, nodes, outshoots, overhangs, depressions, dents, fossettes, mortises, crenas, apertures, holes, ties, screw thread, worms, ribs, tenons, splines, slips, dovetails, dowels, depressions and the likes.

According to some embodiments of the present invention, the electrofusion coupling member is generally shaped as a cylinder, a disc, a socket, a sleeve, a flat ring, an O-ring, an X-ring, a Q-ring, a gasket, a flange gasket, a sheet, a mat or a saddle.

FIG. 1A presents an isometric illustration of an exemplary electrofusion coupling member, according to some embodiments of the present invention, represented by electrofusion coupling member 10 shaped as a mat or a disc, showing body 12, made from aluminum particles-containing thermoplastic composition 16 and having contact surface 13a and 13b (not shown) and heating element 14 going through hole 18 and having terminal means 15, disposed in body 12 by being embedded in a spiral track formed on surfaces 13a and 13b.

FIG. 1B presents a longitudinal cross section of the exemplary electrofusion coupling member 10 presented in FIG. 1A, wherein heating element 14 is passed through hole 18 so as to be embedded in both surface 13a and surface 13b, according to some embodiments of the present invention.

The term "contact surface", as used herein, refers to an area on the surface of the body of an electrofusion coupling member, which comes in contact with the object to be joined to, and melts during the welding to fuse with a joint surface of the object to be joined to.

As used herein, the term "joint surface" refers to an area on the surface of an object that comes in contact with the EFC. This joint surface is the part of the object that melts and is being welded to the electrofusion coupling member of the EFC. It is the joint surface that must be pretreated when using contemporary EFCs.

In general, the contact surface and the joint surface constitute a pair of mating surfaces, wherein the topography of one surface matches the topography of the other counterpart, essentially fitting one-another to contact substantially throughout the entire, or at least some of the matching area.

According to some embodiments, the electrofusion coupling member can be used as an electrofusion coupler device per se, namely is can be welded to at least one thermoplastic object, or it can be placed between two joining thermoplastic objects to thereby fuse the two object to one-another.

In the context of some embodiments of the present invention, the electrofusion coupling member forms a part of an EFC, which has other structural and functional features, whereas one face of the member is a contact surface with respect to the EFC, and the other face is a contact surface with respect to the object to be joined to.

Electrofusion Coupler Device:

In another aspect of embodiments of the present invention, the electrofusion coupling member forms a part of an electrofusion coupler device. The main body of the EFC device is made of a thermoplastic substance, which is not necessarily identical in composition to the thermoplastic composition making the member provided herein, but such that the two substances can fuse to one another. Thus, there is provided an electrofusion coupler device which includes the electrofusion coupling member provided herein.

The electrofusion coupler device can be, without limitation, a pipe fitting, an adaptor, a flange, a flange clamp, a mat, a socket, a sleeve, a saddle, a branch saddle, a branch union, a transition saddle, a sewer saddle, a half coupling, a flex restraint, a tapping tee, a muff, a fixed elbow, an adjustable elbow, a trap, a splitter, a manifold, a reducer, an eccentric reducer, a nipple, an end-cap, a spigot and/or a valve.

Figure 2:
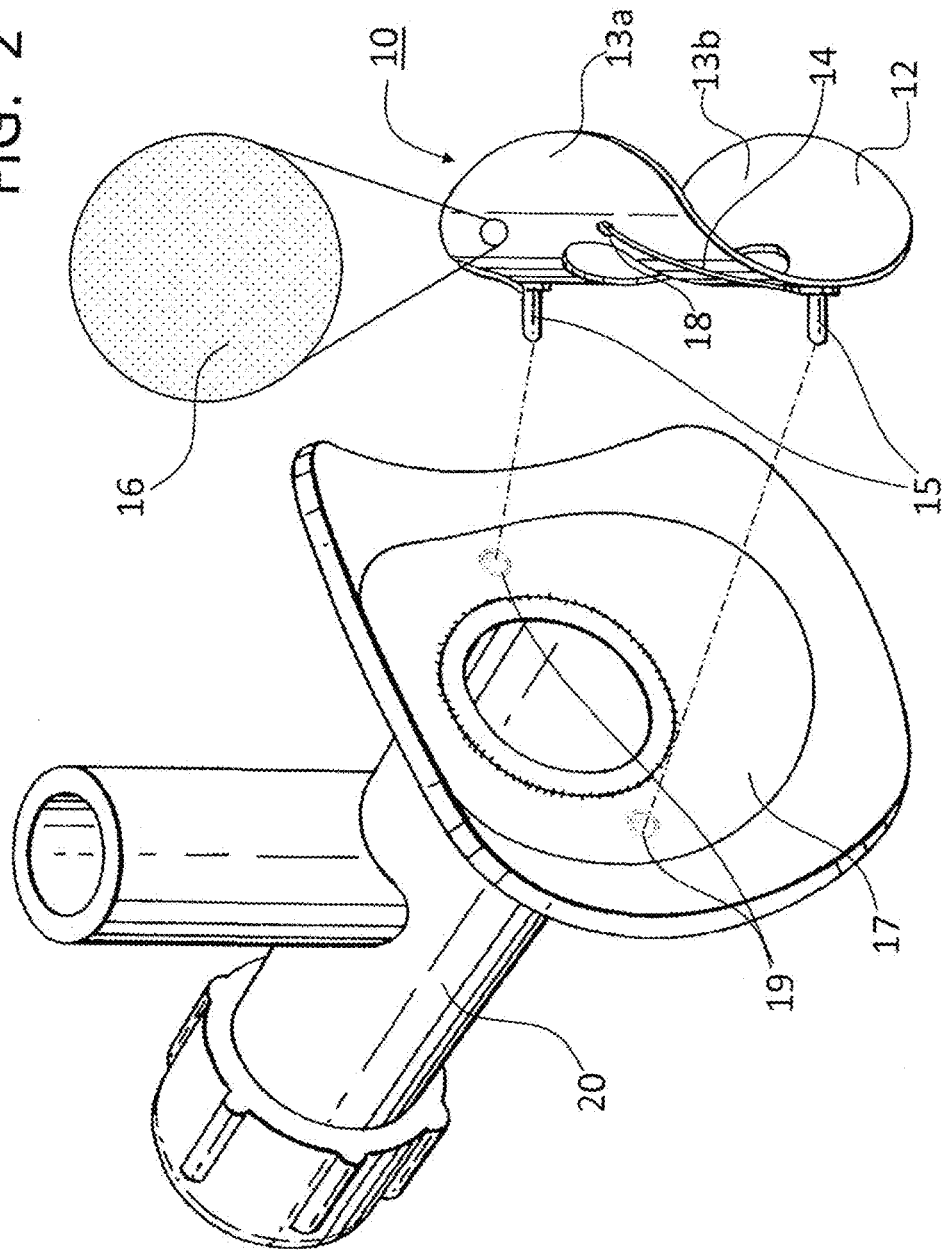
FIG. 2 presents a perspective illustration of a view from below of an electrofusion coupler tapping tee, showing exemplary electrofusion coupling member 10 of FIGS. 1A-B shaped as a saddle.

In all of the abovementioned EFC devices, one or more of the EF member(s) presented herein constitutes at least one contact surface of the device, namely the face of the member which come in contact with the other object to be joined to, is the surface which eventually fuses thereto. FIG. 2 presents an illustration of exemplary EFC device in the form of a tapping tee.

The fusion of the member provided herein to the main body of an EFC device may take place during the manufacturing process of the device (e.g., in over-molding or in a multi-injection process), or during the EF coupling process wherein the pipe, the EF coupling member and the EFC device fuse to one-another in situ. In the latter case, prior to the electrofusion process, the EF coupling member provided herein can be attached to the body of the EFC device by reversible/removable or fixed mechanical means (screws, clips, removable ties, pressed into a recess and the likes) or be provided separately therefrom.

FIG. 2 presents a perspective illustration of a view from below of a EFC tapping tee, according to embodiments of the present invention, showing the exemplary electrofusion coupling member 10 of FIGS. 1A-B shaped as a saddle (a bent disc), wherein body 12, made of aluminum particles-containing thermoplastic composition 16, is having contact surface 13a that matches joining surface 17, which is a recess at the bottom of tapping tee 20, and contact surface 13b for welding the tapping tee onto a pipe (not shown), which is effected by energizing heating element 14, via terminal means 15, which pass through openings 19.

As can be seen in FIG. 2, the exemplary EFC tapping tee is an embodiment wherein the separate saddle-shaped electrofusion coupling member may be clipped into a recess molded in the bottom saddle of the EFC. The electrofusion coupling member has an aperture that coincides with the axial bore of the body of the tapping tee. In such an embodiment, the electrofusion coupling member has a heating element disposed on both sides of the disc, whereby the element is fused simultaneously to both the bottom saddle of the tapping tee and to the pipeline during the electrofusion process.

A Method of Welding Two Thermoplastic Objects:

The EF coupling member presented herein, either per se or as a part of an EFC device, can be used to weld at least two thermoplastic objects, such as two pipes.

According to an aspect of embodiments of the present invention, there is provided a method of welding at least two thermoplastic pipes, which utilizes an EF coupling member as described herein, in any one of the embodiments thereof.

The method can be executed using an exemplary EF coupling member as described herein, which is formed in a shape of an electrofusion coupler pipe-adaptor having two openings, or is used within an electrofusion coupler pipe-adaptor having the EF coupling member disposed at its inner socket, serving as a contact surface thereof, and having two openings. The electrofusion coupler further comprises electric heating resistance element and means for connecting the electric heating resistance element to a power source.

The method comprises inserting the end of each of the pipes into each of the openings of the pipe-adapter:

connecting the terminal means to the electric power source;

applying a predetermined current through the electric resistance heating element for a predetermined period of time to thereby melt the thermoplastic substance; and allowing the thermoplastic substance to cool and solidify to thereby weld the two pipes into a continuous pipe.

Figure 3:
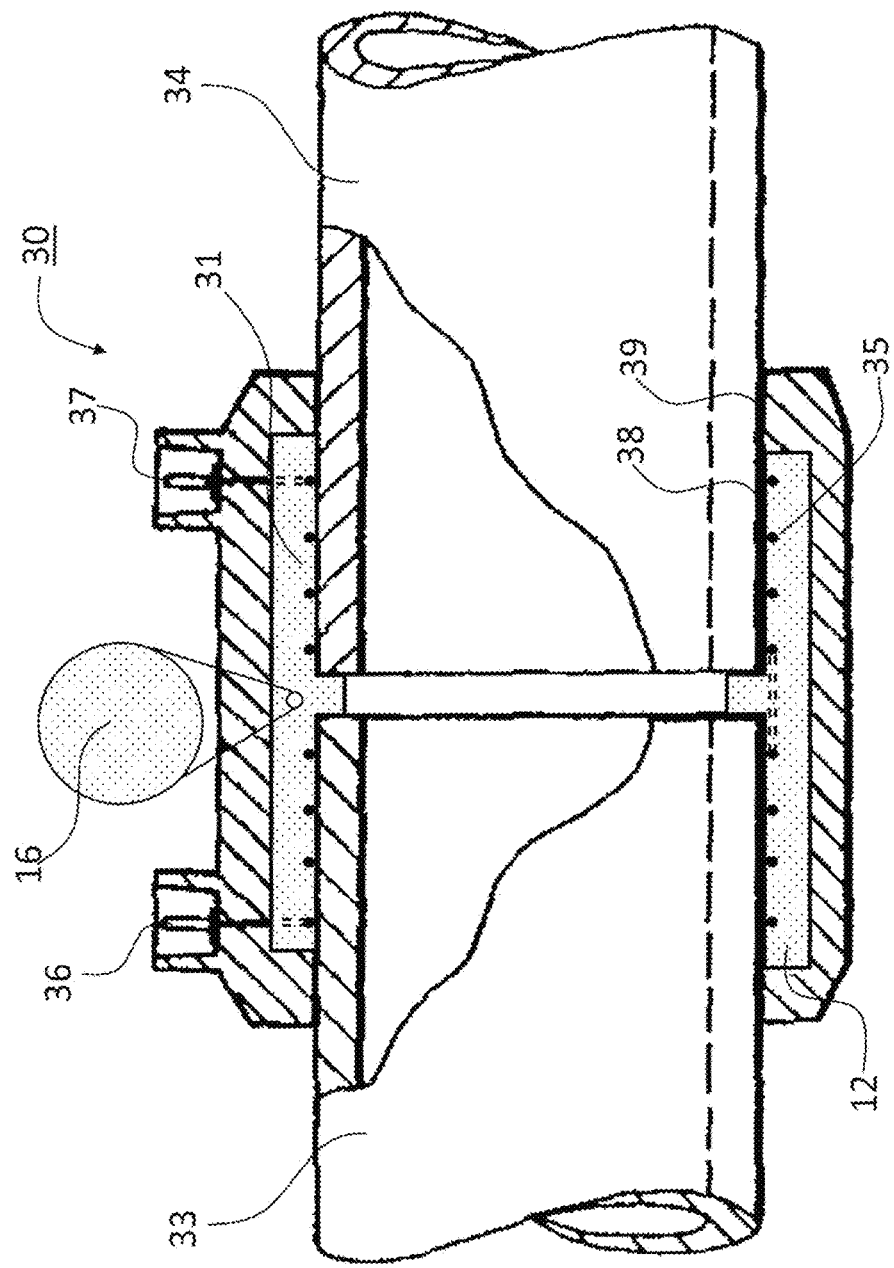
FIG. 3 presents a longitudinal section through the junction of two pipe ends using an exemplary EFC pipe-adaptor or pipe-fitting, according to some embodiments of the present invention, showing sleeve-shaped electrofusion coupling member 31 forming a part of EFC pipe-adaptor 30.

The step of the method presented herein, which includes inserting two pipe ends into an electrofusion coupler pipe-adaptor having the member presented herein serving as its inner contact surface, is illustrated FIG. 3.

FIG. 3 presents a longitudinal section through the junction of two pipe ends using an exemplary EFC pipe-adaptor or pipe-fitting, according to embodiments of the present invention, showing sleeve-shaped electrofusion coupling member 31, made of aluminum particles-containing thermoplastic composition 16, forming a part of EFC pipe-adaptor 30.

As can be seen in FIG. 3, for the purpose of joining the ends of two thermoplastic pipes 33 and 34, use is made of EFC pipe-adaptor 30, which comprises sleeve-shaped electrofusion coupling member 31, which is made of aluminum particles-containing thermoplastic composition 16, having heating element 35 embedded in member 31 and two terminals 36 and 37. Heating element 35 is wound around and disposed adjacent to contact surface 38 of body 12, which is flush with inner extension wall 39 of EFC adaptor 30 and forms the welding area between the ends of pipelines 33 and 34 and the inner wall of EFC adaptor 30.

The next step of welding the pipes includes energizing the heating element with a predetermined electric current for a predetermined period of time. Once the time had elapsed, the joint pipes and EFC are allowed to cool and the molten thermoplastic is allowed to solidify, thereby forming a continuous pipe.

It is noted that the method presented herein can be carried out for all types of EFC devices with a variety of thermoplastic objects, similar to any known electrofusion welding process used hitherto.

According some embodiments of the method, the joint surface at the end of each of the pipes is cleaned prior to insertion into the electrofusion coupler pipe-adaptor.

It is noted that the EF coupling member presented herein is effective also in cases where the object's joint surface is only partially pretreated for the process, namely the effect of the aluminum particles dispersed in the body of the EF coupling member, according to embodiments of the present invention, allows the method to result in satisfactory welding even if the joint surface of the thermoplastic object(s) is not scraped optimally so as to remove the exterior layer of the material.

A Process of Manufacturing:

The process of manufacturing the electrofusion coupling member presented herein and/or an EFC device comprising the same can be effected by following known plastic articles production methodologies and technologies, including raw plastic material preparation, mold preparation and plastic injection technologies.

According to an aspect of some embodiments of the present invention there is provided a process of manufacturing the electrofusion coupling member presented herein, which comprises:

mixing pellets of a first thermoplastic substance having a plurality of aluminum particles dispersed therein (also referred to herein as the "stock aluminum suspension" substance) with pellets of a second thermoplastic substance (also referred to herein as the "base" substance) to thereby form an aluminum particles-containing thermoplastic composition; and melting and injecting (molding) the resulting aluminum particles-containing thermoplastic composition into a mold.

The first thermoplastic substance, which constitutes the bulk of the stock aluminum suspension, may be selected such that it is more suitable for dispersing the aluminum particles in a molten state. In the context of embodiments of the present invention, the raw material comprising the first thermoplastic substances having aluminum particles dispersed therein is prepared by mixing pellets of the first substance with aluminum particles and melting the pellets while stirring. The present inventor has found that molten LLDPE may serve as a suitable carrier for the aluminum particles in the manufacturing process of the electrofusion coupling member, however other thermoplastic substances are contemplated.

Typically, as presented hereinabove, the second thermoplastic substance is one or more polymers of the HDPE variety. Hence, the aluminum particles-containing thermoplastic composition comprises at least the first thermoplastic substance, the second thermoplastic substance and the aluminum particles incorporated therein.

In one exemplary manufacturing process, the body of the electrofusion coupling member provided herein is formed by injecting the aluminum particles-containing thermoplastic composition into a mold having specially designed structural features for housing a heating element in grooves, releasing the cooled composition from the mold, and thereafter placing the heating element in the preformed grooves in the body of the member. In such a process the body of the member is formed in a separate injection process, and the heating element is held in place by being forced into the grooves by "plowing-in" or by treading.

In another exemplary manufacturing process, the heating element is placed in specifically designed positions in the mold prior to the injection step, and the molten aluminum particles-containing thermoplastic composition is injected over the heating element to thereby form the member presented herein. Once the member has cooled and solidified, it can be post-processed to introduce additional structural features therein, and/or reshaped into various forms.

In these two exemplary processes, the electrofusion coupling member is formed either as a part of an EFC device or as an EFC device by itself, which is made entirely from the aluminum particles-containing thermoplastic composition presented herein.

In case the member is used as a part of an EFC device, the member according to some embodiments of the present invention, is manufactured as presented herein, and thereafter it is attached to the body of an EFC device either by over-injection or by other mechanical means.

Hence, according to an aspect of embodiments of the present invention, there is provided a process of manufacturing an EFC device, which is carried out by placing the member presented herein in a mold, and injecting the first thermoplastic substance, as presented hereinabove, into the mold such that the member forms a contact surface of the device.

It is expected that during the life of a patent maturing from this application many relevant aluminum particles-containing thermoplastic compositions will be developed, and the scope of the term aluminum particles-containing thermoplastic composition is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Aluminum Particles-Containing Thermoplastic Composition

For a base thermoplastic substance, high-density polyethylene (HDPE) was obtained from Ineos Inc. (Switzerland; TUB 121 HDPE; containing 2.3% carbon black). Such substance is referred to herein as a "base" substance.

For an aluminum particle thermoplastic suspension, linear low-density polyethylene (LLDPE) containing about 30% aluminum particles (about 54 micron average size) dispersed therein was obtained from Tosaf Ltd. (Israel, ME96183). Such substance is referred to herein as a "stock aluminum suspension" substance.

Heating element wire (0.4 mm diameter; 52% nickel and 48% iron alloy) was obtained from IMI Scott Limited, UK.

Pipe Material:

Pipes and saddles were made of PE 100, intended for high demands piping applications (Plasson Ltd., Israel).

Weld Integrity Testing Procedure:

The results of the welding procedure using an EFC device comprising the EF coupling member according to some embodiments of the present invention, were evaluated following the industry's widely acceptable standard ISO 13956:2010 "Plastics pipes and fittings—Decohesion test of polyethylene (PE) saddle fusion joints—Evaluation of ductility of fusion joint interface by peel test".

Briefly, the pipe and tapping saddle were fused according to the conditions given in ISO 11413 for electrofusion of PE piping objects (described hereinbelow), and after 24 hours the fused samples were placed in a peel test equipment arrangement (Testometric Model FS100CT, LABOR machine s.r.o., The Czech Republic). The test equipment was operated such that the saddle was separated from the pipe at a speed of about 100±10 mm/min. The test piece was inspected visually and the location of the rupture in the pipe and/or the saddle between the wires or the fusion interface was recorded in terms of the type of rupture and whether or not a brittle fracture surface was observed. Specifically, the maximum brittle fracture length in radial direction of the fusion zone, and the overall length of the fusion zone at the same location was recorded and measured, and the percentage decohesion (ductility percentage) was calculated as described in ISO 13956:2010.

Electrofusion Coupler Production:

For the purpose of testing the welding parameters obtained by the aluminum particles-containing thermoplastic composition provided herein, according to some embodiments of the present invention, a series of generally round and bent EF mats was designed and prepared by injection of a series of aluminum particles-containing thermoplastic compositions. These mats were subsequently incorporated in a PE 100 pipe saddle during the plastic injection process. The EF mats were molded inter alia to feature radial ribs and spiral grooves to house a heating element wire.

Table 1 presents the aluminum particles-containing thermoplastic compositions, according to some embodiments of the present invention, containing a base and different amounts of a stock aluminum suspension, which was injected into a mold for an EF mat in each sample.

TABLE 1

| Sample No. | Base content (%) | Stock aluminum suspension content (%) | Aluminum particles content (%) |
|---|---|---|---|
| 0 (control) | 100 | 0 | 0 |
| 1 | 95 | 5 | 1.5 |
| 2 | 90 | 10 | 3 |
| 3 | 80 | 20 | 6 |
| 4 | 70 | 30 | 9 |

Each EF mat was fitted with about 3 meters of a heating element wire, which was winded into the spiral grooves, and the mat was placed in the injection mold of a standard EFC tapping saddle device (Plasson LTD.'s Product No. 496300160032), which is made of PE100 according to standards (ISO 4427, ISO 8085, EN 1555, EN 12201, AS/NZS 4129, AFNOR NF 136), and features a nominal diameter of mains 160 mm and a nominal diameter of outlet 32 mm.

Welding Integrity:

Tapping saddles (160 mm/32 mm), comprising an EF coupling member prepared using an aluminum particles-containing thermoplastic composition, according to some embodiments of the present invention, were welded onto an SDR11/PE100 pipe according to the following procedure:

The pipe's joint surface was cleaned using water (it is noted that all pipe samples were not scraped prior to welding, and the outer layer of the pipes was not removed from the joint surface's area);

The tapping saddle was fastened onto the pipe using its integrated clamp, and the heating element thereof was connected to an electronic welding controller (Plasson's Monomatic USB Cat. No. 29143.0202.000);

The controller was set to 40 volts and current was applied through the EF coupling member's heating element for 220 seconds; and The welding controller was thereafter disconnected and the sample was allowed to cool for 10 minutes.

Thereafter, the welded saddle and pipe were subjected to the weld integrity testing procedure described hereinabove, and the results are presented hereinbelow.

TABLE 2

| Sample No. | Aluminum particles content (%) | Ductility (%) |
|---|---|---|
| 0 (control) | 0 | 0 |
| 1 | 1.5 | 50 |
| 2 | 3 | 100 |
| 3 | 6 | 100 |
| 4 | 9 | 100 |

As can be seen in Table 2, electrofusion was executed successfully using an EFC tapping saddle device, wherein the EF coupling member thereof was prepared using the an aluminum particles-containing thermoplastic composition, according to some embodiments of the present invention, containing at least 3% by weight aluminum particles, even on pipe samples wherein their joint surface was not scrapped prior to welding.

Example 2

A series of PE100-based sleeve-shaped electrofusion coupling members for 90 mm bore EFC pipe-adaptors or pipe-fittings, similar in shape and function to the coupler shown in FIG. 3, was prepared by extrusion essentially as described hereinabove to afford a coupling member having 6% by weigh aluminum particles in two average particle size, 54 micron (Sample 5) and 13 micron (Sample 6), both in PE100. The sample compositions are listed in Table 3 below.

TABLE 3

| Sample No. | Average particle size | Particle amount (wt. % in PE100) |
| --- | --- | --- |
| 5 | 54 micron | 6 |
| 6 | 13 micron | 6 |

The EFC were tested by peel test essentially as described hereinabove and the results are presented in FIG. 4.

Figure 4:
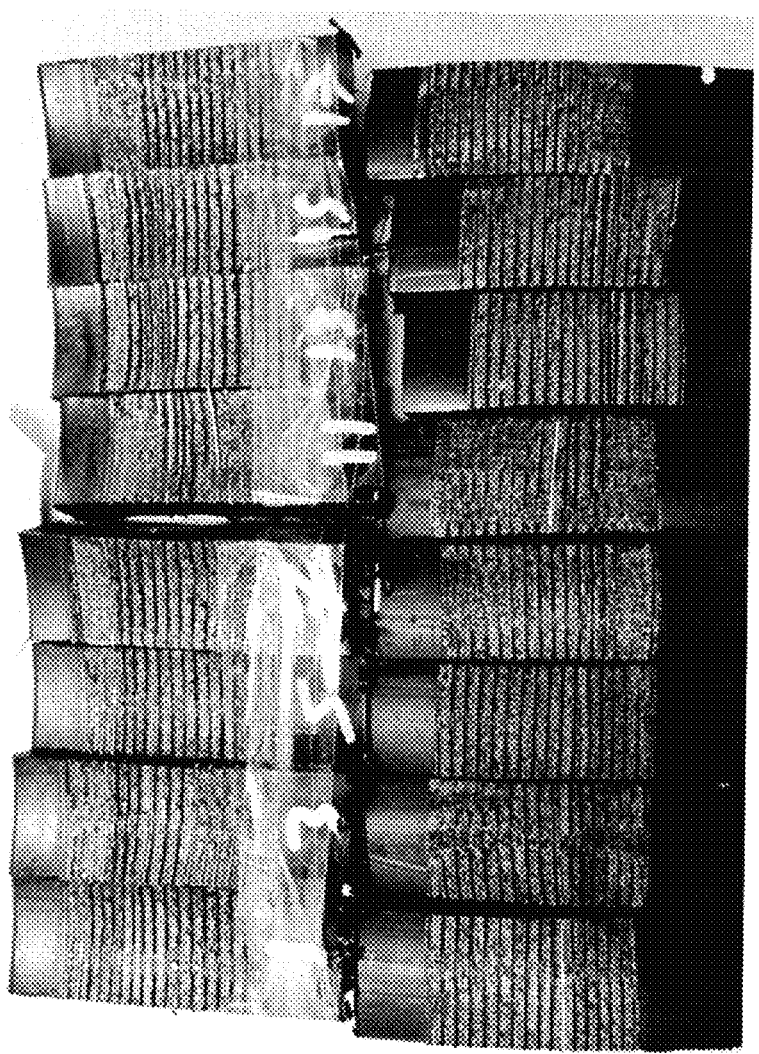
FIG. 4 is a photograph showing four EFC pipe-adapter devices prepared with Sample 5 electrofusion coupling member, fused onto PE00 pipes, peeled off and sectioned longitudinally into quarters.

FIG. 4 is a photograph showing four EFC pipe-adapter devices prepared with Sample 5 electrofusion coupling member, fused onto PE00 pipes, peeled off and sectioned longitudinally into quarters.

As can be seen in FIG. 4, all EFC pipe-adapter devices, prepared with Sample 5 EF member, exhibited high performance electrofusion results of well over (more than) the minimal standard of at least ⅔ of the contact surface of the device with the pipes. EFC pipe-adapter devices prepared with Sample 6 EF member showed similar results (not shown).

EFC 90 mm inner diameter pipe-adapter devices fitted with an EF member prepared with 6% aluminum particles having an average diameter of 13 or 54 microns, were equilibrated before fusing at two temperatures and fused at two voltage settings, and thereafter tested for integrity and hydraulic upholding of two pipe ends under extreme conditions of 10 bar (pressure), 80° C. (temperature) and at least 1000 hours (time). The pipes were either scraped or un-scraped. The control experiments were conducted using EFC 90 mm inner diameter pipe-adapter devices fitted with an EF member prepared without aluminum particles. The results are presented in Table 4 below, whereas the pre-fusing equilibration temperature and the fusing voltage are listed under "Pre-fusing/voltage".

TABLE 4

| Pre-fusing/voltage | Pipe scraping | Aluminum particles | Pass/Fail |
| --- | --- | --- | --- |
| −10° C./39 V | + | none | Pass |
| 20° C./40 V | − | none | Fail |
| −10° C./39 V | + | 13μ or 54μ | Pass |
| 20° C./40 V | − | 13μ or 54μ | Pass |

As can be seen in Table 4, the EFC pipe-adaptors prepared with aluminum particles passed the hydraulic tests successfully using scraped and un-scraped pipes, which the EFC pipe-adaptors prepared without aluminum particles passed the hydraulic tests successfully only when the pipes were scraped.

A general understanding stemming from the preliminary results presented hereinabove indicate that a relatively smaller amount of finer particles (less than 10% by weight and finer than 50 microns average diameter) may be advantageous in some embodiments wherein the EF member and/or the fused interface should be characterized by minimal discontinuities in the polymer's bulk, whereas the discontinuities are caused by the presence of a non-polymeric substance, such as the particles.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An electrofusion coupling member comprising:
    a body having at least one contact surface; and
    at least one electric resistance heating element disposed in or on said body adjacent to said contact surface,
    wherein said body comprises at least one thermoplastic composition comprising a thermoplastic substance and a plurality of aluminum particles incorporated in said thermoplastic substance and constituting an aluminum particles-containing thermoplastic composition, said aluminum particles are characterized by an average diameter that ranges from 5 microns to 100 microns and a concentration in said thermoplastic substance that ranges from 3 weight percent to 10 weight percent of the total weight of said thermoplastic substance.

2. The electrofusion coupling member of claim 1, wherein said contact surface is sized and shaped to match a joint surface of at least one thermoplastic object.

3. The electrofusion coupling member of claim 2, wherein said contact surface and said joint surface constitute a pair of mating surfaces.

4. An electrofusion coupler device comprising the electrofusion coupling member of claim 1.

5. The device of claim 4, wherein said electrofusion coupling member is a contact surface of the device.

6. The device of claim 5, wherein said contact surface is sized and shaped to match a joint surface of at least one thermoplastic object.

7. A process of manufacturing the device of claim 4, the process comprising placing said electrofusion coupling member in a mold, and injecting a thermoplastic substance into said mold such that the member forms a contact surface of the device.

8. A process of manufacturing the electrofusion coupling member of claim 1, comprising:
    mixing pellets of a first thermoplastic substance having said plurality of aluminum particles dispersed therein with pellets of a second thermoplastic substance to thereby form said aluminum particles-containing thermoplastic composition; and molding said aluminum particles-containing thermoplastic composition in a predesigned mold.

9. The process of claim 8, further comprising, prior to said mixing, dispersing said plurality of aluminum particles in said first thermoplastic substance in a molten state; and forming said pellets of said first thermoplastic substance having said plurality of aluminum particles dispersed therein.

10. The process of claim 8, further comprising disposing said electric resistance heating element in said body by disposing said electric resistance heating element in said mold prior to said molding or by disposing said electric resistance heating element in preformed grooves in said body following said molding.

11. A method of welding at least two thermoplastic pipes, the method comprising:

providing the electrofusion coupling member of claim 1 formed in a shape of a pipe-adaptor having two openings;

inserting said end of each of the pipes into each of said openings; and applying a predetermined current through said electric resistance heating element for a predetermined period of time, to thereby melt said thermoplastic substance.

12. The method of claim 11, further comprising, prior to said inserting, cleaning a joint surface at the end of each of the pipes.

* * * * *